United States Patent [19]
Goetze et al.

[11] 3,723,530
[45] Mar. 27, 1973

[54] PRODUCTION OF MIXTURES OF MONOETHANOLAMINE AND TRIETHANOLAMINE

[75] Inventors: Walter Goetze; Peter Wolf; Gerhard Schulz, all of Ludwigshafen; Horst Luedemann, Limburgerhof, all of Germany

[73] Assignee: Badische Anilin- & Soda-Fabrik Aktiengesellschaft, Ludwigshafen, Rhine, Germany

[22] Filed: Nov. 4, 1970

[21] Appl. No.: 86,988

[52] U.S. Cl..........260/584 R, 260/585 R, 260/585 B
[51] Int. Cl................................................C07c 85/06

[58] Field of Search....................................260/584 R

[56] References Cited

UNITED STATES PATENTS 2,051,486   8/1936   Kautter............................260/584 R Primary Examiner—Lewis Gotts
Assistant Examiner—Richard L. Raymond
Attorney—Johnston, Root et al.

[57] ABSTRACT

The production of mixtures of monoethanolamine and triethanolamine by reaction of diethanolamine and ammonia with ethylene oxide in certain molar proportions.

13 Claims, No Drawings

PRODUCTION OF MIXTURES OF MONOETHANOLAMINE AND TRIETHANOLAMINE

The mixture which can be prepared by the process according to the invention is a valuable starting material for the production of raw materials for detergents, wetting agents, shampoos, emulsifiers, polishes and textile, leather and surface coating auxiliaries.

The invention relates to a process for the production of mixtures of monoethanolamine and triethanolamine by reaction of diethanolamine and ammonia with ethylene oxide in certain molar proportions.

It is known that ethanolamines can be prepared by reacting ammonia in aqueous solution, with ethylene oxide at elevated temperatures and superatmospheric pressures (UK Pat. No. 760,215; the periodical Yukagaku, vol. 15, no. 5, 215–220 (1966); Chimica, vol. 20, 29–31 (1966)). Since this is a system of concurrent secondary reactions, monoethanolamine diethanolamine and triethanolamine are always formed side by side. U.S. Pat. application Ser. No. 819,463 filed Apr. 25, 1969 now abandoned, by Roland Dahlinger, teaches that with an excess of ammonia and with a residence time of at least 3 minutes, monoethanolamine is preferentially formed.

For the production of triethanolamine on an industrial scale it has hitherto only been possible to vary the molar ratio of ammonia to ethylene oxide or to react diethanolamine or monoethanolamine with ethylene oxide.

The disadvantage of the said methods is that a mixture of the three components or preferentially monoethanolamine or triethanolamine is obtained. Separation of diethanolamine by distillation followed by reaction with ethylene oxide to form triethanolamine is also uneconomical because a second reactor is required for the purpose.

The object of this invention is a new process for the production of mixtures of monoethanolamine and triethanolamine in which the ethylene oxide used is reacted exclusively to mono- and triethanolamine by adding a certain amount of diethanolamine to the reacting mixture.

We have now found that a mixture of monoethanolamine and triethanolamine is advantageously obtained by reaction of ammonia and ethylene oxide in liquid phase at elevated temperature and superatmospheric pressure when diethanolamine is reacted with ethylene oxide in a molar ratio of from 0 to 1 mole and with ammonia in a molar ratio of from 14 to 40 moles per mole of ethylene oxide.

The reaction may be represented by the following equation:

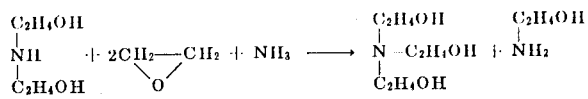

Compared with prior art methods, the ethylene oxide used is surprisingly, reacted in the process according to the invention exclusively to monoethanolamine and triethanolamine when a certain amount of diethanolamine is added to the reacting mixture. A second stage in which the diethanolamine is oxyethylated to triethanolamine is thus unnecessary. In particular, the process when operated continuously enables the reaction of ammonia with ethylene oxide to be carried out more economically while reusing some or all of the diethanolamine from the reaction mixture.

The three starting materials are reacted with each other in liquid phase in a ratio of from 0 to 1, preferably 0 to 0.3 mole of diethanolamine and from 14 to 40, preferably 18 to 22, moles of ammonia to 1 mole of ethylene oxide. Ammonia is normally used in an aqueous 50 to 100 percent, preferably 78 to 82 percent, by weight solution. The reaction is generally carried out at a temperature of from 60° to 150° C, preferably from 80° to 120° C, and at a pressure of from 20 to 120, preferably from 50 to 80, atmospheres, batchwise or, preferably, continuously. The residence times of the reaction mixture in the reaction chamber are as a rule at least 1 minute, advantageously from 7 to 12 minutes.

The reaction may be carried out as follows:

A mixture of the three starting materials in the molar ratio specified above is reacted under the specified conditions of temperature, pressure and rate of reaction either batchwise or continuously. A tubular reactor is advantageously used as the reaction chamber. A unidirectional and turbulent flow prevents varying residence times and provides good heat exchange conditions. The reaction may be carried out in a water-cooled pipe coil approximately isothermally or advantageously adiabatically by preheating the reacting components for example to 70° C to achieve a predetermined reaction temperature of, for example, 110° C. The composition of the product is practically unaffected by the reaction temperature. About 23 kcal is produced per mole of ethylene oxide being reacted. After the reaction, the mixture obtained is separated into its components by a conventional method, for example by distillation.

In a preferred, continuous, form of the process, ethylene oxide and ammonia are reacted according to one of the said prior art methods and the diethanolamine is separated from the resultant reaction mixture by a conventional method, for example by continuous distillation. Some or all of this component is continuously returned, the returned portion serving, together with fresh ammonia and ethylene oxide in the said amounts, as starting materials of the process according to the invention. In this economical manner substantially only the desired monoethanolamine and triethanolamine are produced by continuously supplying the two starting materials (ammonia and ethylene oxide), separating two components and returning the third component of the reaction mixture obtained. Thus when all the diethanolamine component is returned, (for example at a ratio of 0.3 mole of diethanolamine to 1 mole of ethylene oxide and 20 moles of ammonia) end mixtures of 70 percent by weight of monoethanolamine and 30 percent by weight of triethanolamine are obtained. Contrasted with this, end mixtures having 78 to 70 percent by weight of monoethanolamine, 19 to 0 percent by weight of diethanolamine and 3 to 30 percent by weight of triethanolamine are obtained at a ratio of 0 to 0.3 mole of diethanolamine to 1 mole of ethylene oxide and 20 moles of ammonia in the starting mixture. Surprisingly it is not necessary to lengthen the residence times in the continuous method according to the invention as compared with the prior art methods (i.e. without returning the diethanolamine component) in order to achieve complete reaction of the ethylene oxide.

The mixture which can be prepared by the process according to the invention is a valuable starting material for the production of raw materials for detergents, wetting agents, shampoos, emulsifiers, polishes, textile auxiliaries, leather auxiliaries and auxiliaries for surface coatings. Reference is made to Ullmanns Encyklopadie der technischen Chemie, vol. 3, 100 et seq., as regards such use.

The following Example, in which parts are by weight, illustrates the invention.

EXAMPLE 18.7 parts per hour of 80 percent by weight aqueous ammonia solution 1.3 parts per hour of diethanolamine and 2 parts per hour of ethylene oxide are brought together at room temperature and the resultant solution is passed at a velocity of 12.5 cm/sec through a reaction tube in the form of a spiral 60 meters in length and 9 mm in nominal diameter. The molar ratio of ammonia to ethylene oxide is 20:1. The interior of the reaction tube is kept at 122° C by external cooling with oil. It is also possible to carry out the reaction adiabatically preheating the components to 82° C so that the temperature rises to 122° C as a result of the exothermic heat of reaction. The reaction is carried out at a pressure of 90 atmospheres.

After a residence time of 9 minutes, the pressure on the reaction mixture is released at the outlet of the tube, excess ammonia escaping. The aqueous solution which remains is fractionally distilled.

2.5 parts of a mixture is obtained which consists of 74 percent by weight of monoethanolamine having a boiling point of 171° C and 26 percent by weight of triethanolamine having a boiling point of 360° C. 1.3 parts of diethanolamine is returned per hour to the reactor from the mixture obtained.

We claim:

1. A process for the production of mixtures of monoethanolamine and triethanolamine by reaction of ammonia and ethylene oxide in liquid phase, at elevated temperature and superatmospheric pressure wherein a small amount of diethanolamine is fed with ethylene oxide in a molar ratio of up to 1 mole of diethanolamine and with ammonia in a molar ratio of from 14 to 40 moles per mole of ethylene oxide into the reaction zone.

2. A process as claimed in claim 1 carried out employing a ratio of up to 0.3 mole of diethanolamine and 18 to 22 moles of ammonia to 1 mole of ethylene oxide.

3. A process as claimed in claim 1 carried out at a temperature of from 60° to 150° C.

4. A process as claimed in claim 1 carried out at a temperature of from 80° to 120° C.

5. A process as claimed in claim 1 carried out at a pressure of from 20 to 120 atmospheres.

6. A process as claimed in claim 1 carried out at a pressure of from 50 to 80 atmospheres.

7. A continuous process for production of mixtures of monoethanolamine and triethanolamine which comprises continuously feeding a feed mixture of ammonia and ethylene oxide in liquid phase at a molar ratio of 14 to 40 moles of ammonia per mole of ethylene oxide to a tubular reactor together with diethanolamine and reacting the feed components in said tubular reactor at a residence time of 1 to 12 minutes at a pressure of 20 to 120 atmospheres and a temperature of 60° to 150° C to obtain a mixture of monoethanolamine and triethanolamine and a small amount of diethanolamine, separating the diethanolamine from said mixture, and returning at least part of the separated diethanolamine to the feed mixture of ethylene oxide and ammonia to provide the diethanolamine in said feed mixture.

8. A process as claimed in claim 7 wherein the molar amount of diethanolamine in said feed mixture is 0.3 to 1 mole of diethanolamine per mole of ethylene oxide.

9. A process as claimed in claim 7 wherein said temperature is in the range of 80° – 120° C.

10. A process as claimed in claim 7 wherein said pressure is in the range of 50 to 80 atmospheres.

11. A process as claimed in claim 7 wherein said reaction time is 7 to 12 minutes.

12. A process as claimed in claim 7 wherein said ammonia in said feed mixture is aqueous ammonia as a 50 – 100 percent by-weight solution.

13. A process as claimed in claim 7 wherein said ammonia in said feed mixture is aqueous ammonia as a 78 – 82 percent by-weight solution.

* * * * *